United States Patent
Lee et al.

(10) Patent No.: US 11,260,862 B2
(45) Date of Patent: Mar. 1, 2022

(54) METHOD FOR CONTROLLING ENGINE CLUTCH OF VEHICLE

(71) Applicants: Hyundai Motor Company, Seoul (KR); Kia Motors Corporation, Seoul (KR)

(72) Inventors: Chun Hyuk Lee, Hwaseong-si (KR); Kwon Chae Chung, Seoul (KR); Seong Ik Park, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 17/032,503

(22) Filed: Sep. 25, 2020

(65) Prior Publication Data

US 2021/0309225 A1 Oct. 7, 2021

(30) Foreign Application Priority Data

Apr. 3, 2020 (KR) ........................ 10-2020-0040667

(51) Int. Cl.
*B60W 30/18* (2012.01)
*B60W 10/02* (2006.01)
*B60W 20/40* (2016.01)
*B60W 10/06* (2006.01)
*B60W 10/08* (2006.01)
*B60K 6/387* (2007.10)
*F16D 48/02* (2006.01)

(52) U.S. Cl.
CPC ....... *B60W 30/18027* (2013.01); *B60K 6/387* (2013.01); *B60W 10/023* (2013.01); *B60W 10/06* (2013.01); *B60W 10/08* (2013.01); *B60W 20/40* (2013.01); *F16D 25/14* (2013.01); *B60W 2510/0638* (2013.01); *B60W 2510/081* (2013.01); *B60W 2510/30* (2013.01); *B60W 2540/215* (2020.02); *B60W 2710/021* (2013.01); *B60W 2710/0666* (2013.01); *B60W 2710/086* (2013.01); *B60Y 2200/92* (2013.01); *B60Y 2300/42* (2013.01)

(58) Field of Classification Search
CPC ......... B60W 30/18027; B60W 10/023; B60W 10/06; B60W 10/08; B60W 20/40; B60W 2540/215; B60W 2510/0638; B60W 2510/081; B60W 2510/30; B60W 2710/021; B60W 2710/0666; B60W 2710/086; B60K 6/387; F16D 25/14; B60Y 2200/92; B60Y 2300/42
See application file for complete search history.

(56) References Cited

U.S. PATENT DOCUMENTS

| 2004/0134698 A1* | 7/2004 | Yamamoto | B60K 6/44 180/65.225 |
| 2009/0115282 A1* | 5/2009 | Nishidate | H02K 1/148 310/216.055 |

* cited by examiner

*Primary Examiner* — Tisha D Lewis
(74) *Attorney, Agent, or Firm* — Morgan, Lewis & Bockius LLP (57) ABSTRACT

A method for controlling an engine clutch of an electrified vehicle is provided to easily engage and disengage an engine clutch by applying a launch engagement control method that utilizes power from both of an engine and a motor in accordance with the variation of the number of revolutions per hour of the engine and the usage rate of electrical energy by a motor to engage the engine clutch in a terrain mode and by applying a control method that disengages an engine clutch early in accordance with the number of revolutions per hour of the engine and the shaft torque of the engine clutch in the terrain mode.

20 Claims, 5 Drawing Sheets

METHOD FOR CONTROLLING ENGINE CLUTCH OF VEHICLE

CROSS REFERENCE TO RELATED APPLICATION

The present application claims priority to Korean Patent Application No. 10-2020-0040667, filed Apr. 3, 2020, the entire contents of which is incorporated herein for all purposes by this reference.

BACKGROUND OF THE INVENTION

Field of the Invention

The present invention relates to a method for controlling an engine clutch of an electrified vehicle and, more particularly, to a method for controlling an engine clutch of an electrified vehicle, the method being able to easily control engagement and disengagement of the engine clutch in a terrain mode which is an off-road driving mode.

Description of Related Art

As well-known in the art, a hybrid vehicle, an electric vehicle, a hydrogen fuel cell vehicle, etc. are provided with an electric motor as a driving source and these vehicles are called electrified vehicles.

Figure 1:
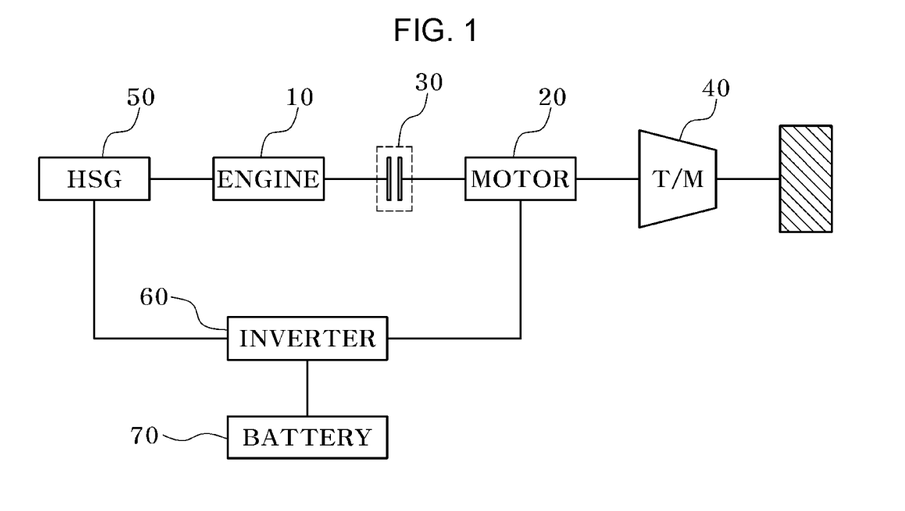
FIG. 1 is a view showing a power transmission system as an example of a powertrain which is applied to electrified vehicles.

FIG. 1 is a view showing a power transmission system as an example of a powertrain which is applied to electrified vehicles.

As shown in FIG. 1, a power train of an electrified vehicle may include: an engine 10 and a motor 20; an engine clutch 30 mounted between the engine 10 and the motor 20 and transmitting or disconnecting engine power; a transmission 40 adapting engine power to driving wheels; a hybrid starter generator (HSG) 50 connected to a crank pulley of the engine 10 to start the engine 10 and generate electricity; an inverter 60 controlling the operation of the motor 20 and the HSG 50; and a battery 70 connected to the motor 20 and the HSG 50 through the inverter to be able to be charged or discharged.

The driving mode such an electrified vehicle includes an electric vehicle (EV) mode that utilizes only motor torque, a hybrid electric vehicle (HEV) mode that utilizes the torque from an engine as main torque and the torque from a motor as auxiliary torque, and a regenerative braking mode that recovers braking energy and inertia energy through electric generation of a motor and charging a battery with the energy when a vehicle is braked or coasted.

When the electrified vehicle is driven on an on-road in the driving modes and an off-road such as a snowy road, a muddy road, and a sandy road appears to be, a terrain mode for an off-road may be used to effectively control sliding on the off-road.

To this end, a driver selects a terrain mode by operating a drive mode selection switch and then selects one of a snow mode, a mud mode, and a sand mode, depending on the ground conditions in the terrain mode.

Accordingly, when the terrain mode is selected, whether there is sliding of wheels is detected, depending on the ground conditions, and driving force is controlled to be appropriately distributed to the non-sliding wheels, whereby a vehicle may be safely driven on a rough road.

Meanwhile, as a control method for engaging the engine clutch, there are a synchronization engagement control method and a launch engagement control method.

The synchronization engagement control method is to synchronize the numbers of revolutions of an engine and a motor and then engage an engine clutch to enter an HEV mode, which utilizes engine power in addition to the motor to accelerate a vehicle after the vehicle is started in an EV mode by the motor.

The launch engagement control method, which is used when it is difficult to secure launch acceleration of a vehicle even in an EV mode, is to charge a battery using a hybrid starter generator which is operated for charging by the operation of an engine and assist power to the motor from the battery with engine torque transmitted to the motor by controlling a slip of the engine clutch, starting the engine in an HEV mode to improve the launch acceleration performance.

However, control for disengaging the engine clutch is performed through a predetermined sequence regardless of a driving load of the vehicle.

That is, the engine clutch is disengaged through a step of decreasing engine torque when driver request torque which is the intention of acceleration of a driver decreases less than a predetermined level and the state of charge (SOC) value of a battery is a predetermined level or higher, and a step of stopping the hydraulic pressure supplied to the engine clutch for engagement when the shaft torque of the engine clutch is less than a reference level.

However, when the engine clutch is engaged or disengaged while the electrified vehicle is driven in the terrain mode, the following problems may occur.

First, since the road surfaces of mud and sand for which the terrain mode is usually used cause a large driving road comparatively to common road surfaces, the amount of electrical energy used by a motor increases, so it is difficult to maintain the charged state of a battery over a predetermined level. Furthermore, the large driving road makes it difficult to synchronize the numbers of revolutions of an engine and a motor to engage an engine clutch.

Second when the engine clutch is disengaged, the number of revolutions of the engine rapidly decreases in the HEV mode due to the large driving load. Furthermore, when the number of revolutions of the engine decreases close to zero (0) before the engine clutch is disengaged, a driver may misrecognize the present state as an engine stall state.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a method for controlling an engine clutch of an electrified vehicle, the method being able to easily engage and disengage an engine clutch by applying a launch engagement control method that utilizes power from both of an engine and a motor in accordance with the variation of the number of revolutions per hour of the engine and the usage rate of electrical energy by a motor to engage the engine clutch in a terrain mode and by applying a control method that disengages an engine clutch early in accordance with the number of revolutions per hour of the engine and the shaft torque of the engine clutch in the terrain mode.

To achieve the objectives, a method for controlling an engine clutch of a vehicle includes: checking, by a controller, whether a driving mode of the vehicle has been selected as a terrain mode; checking whether a variation of the number of revolutions per hour of an engine exceeds a reference value A and whether a usage rate of electrical energy per hour of a motor exceeds a reference value B, when determining that the terrain mode has been selected; adjusting an engagement condition of the engine clutch for launch acceleration when determining that the variation of the number of revolutions per hour of an engine exceeds the reference value A and the usage rate of electrical energy per hour of the motor exceeds the reference value B; and engaging, by the controller, the engine clutch through a launch engagement control method when the engagement condition of the engine clutch for launch acceleration is adjusted.

The adjusting of an engagement condition of the engine clutch for launch acceleration may include: a control process of increasing a reference value C of an engine RPM, which may be synchronized with a motor speed, to a predetermined level; a control process of adjusting a reference value D for a driving load and an acceleration variation of the vehicle to a predetermined level; and a battery SOC reference value correction control process of decreasing a reference value E for a battery SOC to a predetermined level.

The control process of increasing a reference value C of an engine RPM, which may be synchronized with a motor speed, to a predetermined level may be performed to satisfy a condition for applying the launch engagement control method for engaging the engine clutch.

The control process of adjusting a reference value D for a driving load and an acceleration variation of the vehicle to a predetermined level may be performed to satisfy a condition for applying the launch engagement control method for engaging the engine clutch.

The battery SOC reference value correction control process of decreasing a reference value E for a battery SOC to a predetermined level may be performed to rapidly engage the engine clutch through the launch engagement control method.

When the reference value C of an engine RPM, which may be synchronized with a motor speed, is increased to a predetermined level, the reference value D for a driving load and an acceleration variation of the vehicle is adjusted to a predetermined level, and the reference value E for a battery SOC is decreased to a predetermined level, the engine clutch may be engaged by the launch engagement control method.

The launch engagement control method may include: a step in which an engine clutch is engaged through slip control of the engine clutch and engine torque is transmitted to a motor; and a step in which motor power is assisted by electrical energy stored and transmitted to the motor after a battery is charged by a charging operation of a hybrid starter generator according to an operation of the engine, or electrical energy produced by a charging operation of the hybrid starter generator is directly transmitted to the motor through an inverter and motor power is assisted.

The method for controlling an engine clutch of a vehicle may further include: checking, by the controller, whether the driving mode of the vehicle is maintained as the terrain mode; checking whether a variation of the number of revolutions per hour of an engine has exceeded a reference value A with the engine clutch engaged and whether shaft torque of the engine clutch exceeds a predetermined reference value F, upon determining that the terrain mode is maintained; and performing, by the controller, control for stopping engine clutch anti-disengagement control or control for forcibly disengaging the engine clutch when the variation of the number of revolutions per hour of an engine exceeds the reference value A and the shaft torque of the engine clutch exceeds the predetermined reference value F.

Hydraulic pressure supplied to the engine clutch may be stopped and the engine clutch is disengaged early by the control for stopping engine clutch anti-disengagement control or the control for forcibly disengaging the engine clutch.

When the control for stopping engine clutch anti-disengagement control or the control for forcibly disengaging the engine clutch is performed, control for increasing an inclination of engine torque and an inclination of hydraulic pressure for disengaging the engine clutch may also be performed to rapidly disengage the engine clutch.

Various aspects of the present invention are directed to providing the following effects from the objectives described above.

First, by applying the launch engagement control method as the method for controlling engagement of an engine clutch in the terrain mode, it is possible to easily launch and accelerate a vehicle by use of engine torque and assisting motor power.

Second, by applying the launch engagement control method as the method for controlling engagement of an engine clutch in the terrain mode, a battery may be charged by a charging operation of a hybrid starter generator according to an operation of an engine or electrical energy is transmitted to a motor and motor power may be assisted, so it is possible to prevent the situation in which an electrified vehicle cannot be driven due to exhaustion of the SOC value of a battery due to driving over a predetermined time using only a motor in the terrain mode.

Third, when a vehicle is driven on a rough road with a mud mode or a sand mode selected in the terrain mode and an engine RPM rapidly decreases or rapid braking is required, the engine clutch is disengaged early, whereby it is possible to secure stable driving when driving on a rough road.

Fourth, by disengaging early the engine clutch when driving on a rough road with a mud mode or a sand mode selected in the terrain mode, it is possible to solve the problem that the number of revolutions of an engine decreases close to zero before an engine clutch is disengaged due to a rapid decrease of the number of revolutions of the engine in an HEV mode due to a very large driving load in the terrain mode and the present situation is misrecognized as an engine stall state.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in detail with reference to the accompanying drawings.

As described above, a terrain mode of driving odes of electrified vehicles may be used to effectively control a sliding on an off-road such as a snowy road, a muddy road, a sandy road.

However, off-roads such as a muddy road and a sandy road for which the terrain mode is used cause a high driving load due to the characteristics of the road surfaces, so there is a defect that launch acceleration of a vehicle is not performed well in the terrain mode.

In other words, since off-roads such as a muddy road and a sandy road cause a high driving load due to the characteristics of the road surfaces in comparison to common road surfaces, the number of revolutions of tires may rapidly decreases, and launch acceleration of a vehicle that requires engagement of an engine clutch may not be performed well in the terrain mode.

Furthermore, when an electrified vehicle is driven over a predetermined time in the terrain mode, the amount of electrical energy which is consumed by a motor increases and the SOC value of a motor rapidly decreases, so that the vehicle may not be driven due to exhaustion of the SOC value of the battery.

Accordingly, the present invention aims at minimizing reduction of the SOC value of a battery by applying a launch engagement control method that utilizes power from both of an engine and a motor to engage an engine clutch in the terrain mode, and addresses preventing misrecognition of engine stall and providing a stable driving comfort by disengaging an engine clutch early in accordance with the number of revolutions per hour of the engine and the shaft torque of the engine clutch in the terrain mode.

A method for controlling an engine clutch of an electrified vehicle according to an exemplary embodiment of the present invention is described hereafter.

Figure 5:
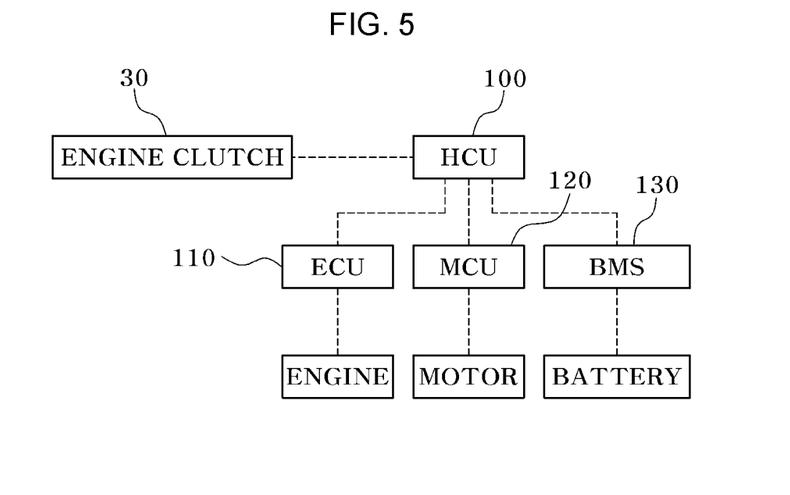
FIG. 5 is a view showing a control configuration for the method for controlling an engine clutch of an electrified vehicle according to an exemplary embodiment of the present invention.

It may be noted that, as subjects related to the control of an engine clutch of the present invention, as shown in FIG. 5, engagement and disengagement control of an engine clutch 30 may be performed by a hybrid controller 100 which is a high-rank controller, control related to operation of an engine may be performed by an engine controller 110 which is instructed by the hybrid controller 100, control related to operation of a motor may be performed by a motor controller 120 which is instructed by the hybrid vehicle, and management of the SOC value of a battery may be performed by a battery controller 130.

Figure 2:
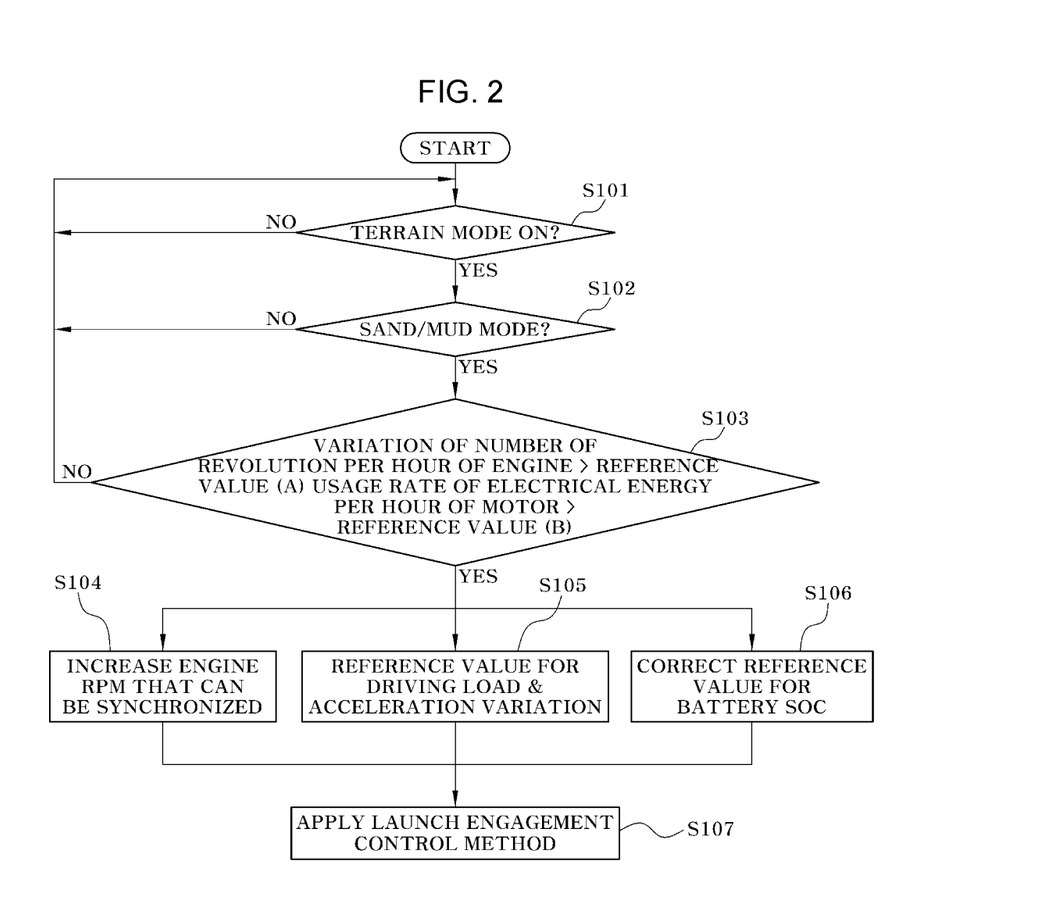
FIG. 2 is a flowchart showing an engagement control process of an engine clutch in a method for controlling an engine clutch of an electrified vehicle according to an exemplary embodiment of the present invention.

FIG. 2 is a flowchart showing an engagement control process of an engine clutch in a method for controlling an engine clutch of an electrified vehicle according to an exemplary embodiment of the present invention.

First, it is checked whether the driving mode of an electrified vehicle has been selected as a terrain mode to perform engagement control of an engine clutch in the terrain mode (S101).

Next, after the terrain mode is selected, it is checked whether a mud mode or a sand mode of the terrain mode has been selected (S102).

For example, the hybrid controller checks whether a driver has selected the terrain mode by operating a mode selection switch and then has selected one of the mud mode or the sand mode of the terrain mode, depending on the road condition.

Next, when it is determined that the mud mode or the sane mode of the terrain mode has been selected, it is checked whether the variation of the number of revolutions per hour of an engine exceeds a reference value A and whether the usage rate of electrical energy per hour by a motor exceeds a reference value B (S103).

For example, the hybrid controller can receive and check information related to whether the variation of the number of revolutions per hour of an engine exceeds the reference value A and can receive and check information related to whether the usage rate of electrical energy per hour by a motor exceeds the reference value B.

The reason of checking whether the variation of the number of revolutions per hour of an engine exceeds the reference value A is for adjusting an engagement condition of the engine clutch for launch acceleration in the terrain mode because the number of revolutions of the engine may rapidly decrease due to a large driving load by the characteristics of the road surface of an off-road such as a muddy road and a sandy road in comparison to a common road surface, easily launching and accelerating a vehicle by applying a launch engagement control method as the method for controlling engagement of an engine clutch.

The reason of checking whether the usage rate of electrical energy per hour by a motor exceeds the reference value B is for motor power assist through a charging operation of a hybrid starter generator according to an operation of an engine by applying a launch engagement control method as the method for controlling engagement of an engine clutch to prevent discharge of a battery due to an increase in consumption of electrical energy by the operation of the motor.

Next, when it is determined that the variation of the number of revolutions per hour of an engine exceeds the reference value A and the usage rate of electrical energy per hour by a motor exceeds the reference value B in the result of checking in step S103, control for increasing a reference value C of the RPM of the engine at which synchronization with a motor speed which is one of the engagement conditions of the engine clutch is possible to a predetermined level is performed (S104).

That is, when it is determined that the variation of the number of revolutions per hour of an engine exceeds the reference value A and the usage rate of electrical energy per hour by a motor exceeds the reference value B, the hybrid controller increases the reference value C of the RPM of the engine at which synchronization with a motor speed is possible to a predetermined level to satisfy a condition for applying a launch engagement control method as the method for controlling engagement of an engine clutch.

Even if the power of an engine is used at about 1100 RPM for common road surfaces, the number of revolutions of an engine does not rapidly decrease, but off-roads such as a muddy road and a sandy road cause a high driving load due to the characteristics of the road surfaces, so that the number of revolutions of an engine may rapidly decrease.

Accordingly, control for increasing the RPM of an engine at which synchronization with a motor speed is possible to the reference value C is performed to satisfy the condition for applying the launch engagement control method as the method for engaging an engine clutch so that the launch engagement control method rather than the synchronization engagement control method may be applied as the method for controlling engagement of an engine clutch.

When it is determined that the variation of the number of revolutions per hour of an engine exceeds the reference value A and the usage rate of electrical energy per hour by a motor exceeds the reference value B, as the result of checking in step S103, the hybrid controller adjusts a reference value D for a driving load and an acceleration variation of a vehicle for applying the launch engagement control method as the method for controlling engagement of an engine clutch to a predetermined level (S105).

The driving load of a vehicle may be obtained, for example, from the specifications of the vehicle and the acceleration variation of a vehicle may be determined using motor torque (e.g., which may be determined from battery power) and the dynamic radius of a tire at the engine RPM at which an engine clutch may be engaged, but it is difficult to accurately determine whether acceleration changes on specific roads (off-roads such as a muddy road and a sandy road). Accordingly, control for adjusting the reference value D the driving load and an acceleration variation of a vehicle to a predetermined level is performed as a condition for applying the launch engagement control method as the method for controlling engagement of an engine clutch in step S105, as described above.

Furthermore, when it is determined that the variation of the number of revolutions per hour of an engine exceeds the reference value A and the usage rate of electrical energy per hour by a motor exceeds the reference value B, as the result of checking in step S103, battery SOC reference value correction control that decreases a reference value E for the SOC value of a battery to a predetermined level for applying the launch engagement control method as the method for controlling engagement of an engine clutch is performed (S106).

For example, battery SOC reference value correction control may be performed by the battery controller which is instructed by the hybrid controller.

In general, the synchronization engagement control method for a method for controlling an engine clutch is performed only for a predetermined control time, and when the engine clutch is not engaged after the predetermined control time, the method for controlling engagement of an engine clutch is changed to the launch engagement control method in which motor power is assisted for launch acceleration.

The predetermined control time for engagement of an engine clutch depends on the SOC value of a battery, and when the SOC value of a battery is low, calibration that decreases the control time is performed.

To this end, by decreasing in advance the reference value E of the SOC value of a battery to a predetermined level, it is possible to use a decreased control time for the decreased SOC value of the battery, and accordingly, it is possible to rapidly change the method for controlling engagement of an engine clutch to a launch engagement control method.

Next, after the steps S104, S105, and S106 are performed, the engine clutch is engaged by the launch engagement control method (S107).

That is, when a step of increasing the reference value C of an engine RPM which may be synchronized with a motor speed to a predetermined level, a step of adjusting the reference value D for a driving load and an acceleration variation of the vehicle to a predetermined level, and a step of decreasing the reference value E of the SOC value of a battery to a predetermined level are performed as steps of adjusting an engagement condition of an engine clutch for launch acceleration which is a pre-step for engaging the engine clutch using the launch engagement control method, the hybrid controller engages the engine clutch using the launch engagement control method.

Figure 3:
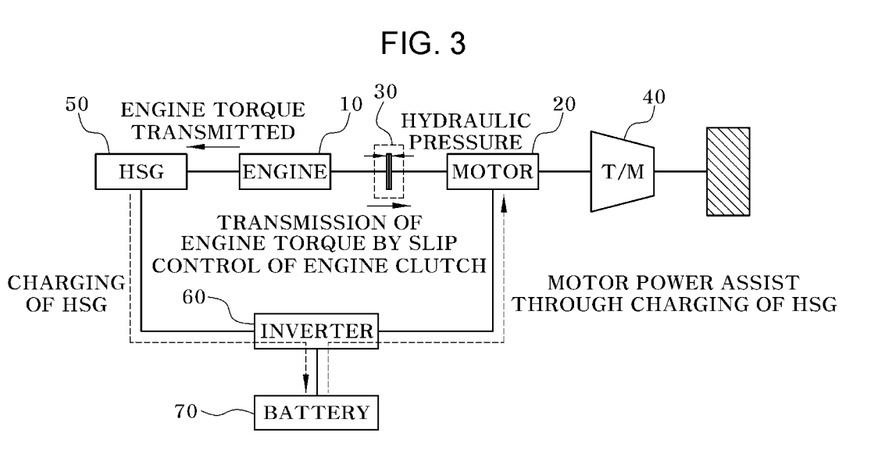
FIG. 3 is a view showing a power transmission system for describing a launch engagement control method for the method for controlling engagement of an engine clutch of an electrified vehicle.

The launch engagement control method, as shown in FIG. 3, includes: a step in which an engine clutch is engaged through slip control of the engine clutch by a hybrid controller and engine torque is transmitted to a motor; and a step in which motor power is assisted by electrical energy stored and transmitted to a motor after a battery is charged by a charging operation of a hybrid starter generator according to an operation of an engine, or electrical energy produced by a charging operation of a hybrid starter generator is directly transmitted to a motor through an inverter and motor power is assisted.

As described above, by applying the launch engagement control method as the method for controlling engagement of an engine clutch in the terrain mode, it is possible to easily launch and accelerate a vehicle by use of engine torque and assisting motor power.

Furthermore, by applying the launch engagement control method as the method for controlling engagement of an engine clutch in the terrain mode, a battery may be charged by a charging operation of a hybrid starter generator according to an operation of an engine or electrical energy is transmitted to a motor and motor power may be assisted, so it is possible to prevent the situation in which an electrified vehicle cannot be driven due to exhaustion of the SOC value of a battery due to driving over a predetermined time using a motor in the terrain mode.

Figure 4:
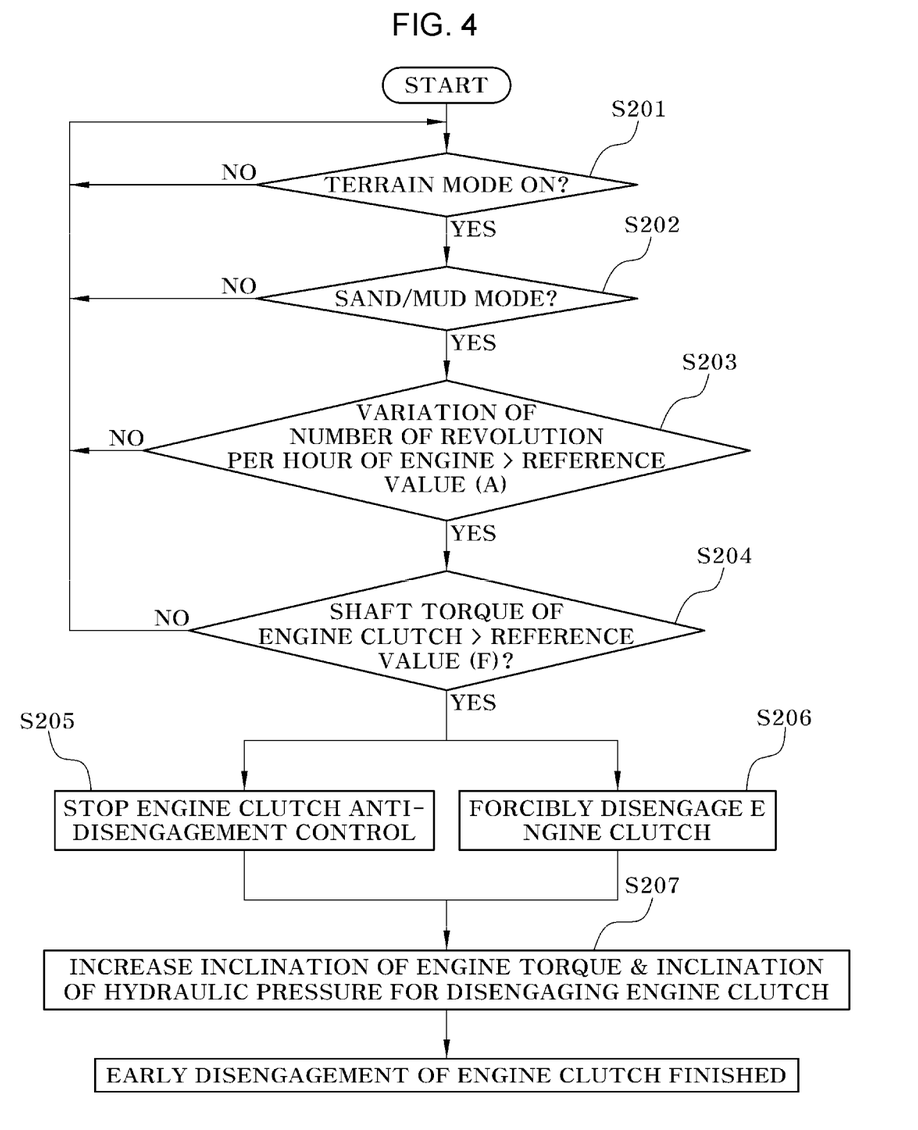
FIG. 4 is a flowchart showing an early disengagement control process of an engine clutch in the method for controlling an engine clutch of an electrified vehicle according to an exemplary embodiment of the present invention.

FIG. 4 is a flowchart showing an early disengagement control process of an engine clutch in a method for controlling an engine clutch of an electrified vehicle according to an exemplary embodiment of the present invention.

First, it is checked whether the driving mode of an electrified vehicle is maintained as a terrain mode to perform early disengagement control of an engine clutch in the terrain mode (S201).

Next, it is checked whether a mud mode or a sand mode remains selected in the terrain mode (S202).

Next, when it is determined that the mud mode or the sand mode remains selected in the terrain mode, it is checked whether a variation of the number of revolutions per hour of an engine has exceeded a reference value A with the engine clutch engaged (S203).

Next, when the variation of the number of revolutions per hour of an engine exceeds the reference value A, it is checked whether shaft torque of the engine clutch has exceeded a reference value F, which is determined in advance through a test, with the engine clutch engaged (S204).

The reason of checking whether a variation of the number of revolutions per hour of an engine exceeds the reference value A is for checking whether the number of revolutions of the engine rapidly decreases with the engine clutch engaged because off-roads such as a muddy road and a sandy road applies a large driving load in comparison to common road surfaces due to the characteristics of the road surfaces thereof, and is for determining whether engine clutch anti-disengagement control is removed (stopped).

In general, while an electrified vehicle is driven at a predetermined speed or higher, driver request torque may be removed by a driver taking a foot off the accelerator pedal or engine clutch anti-disengagement control (a logic forcibly keeping an engine clutch engaged) for maintaining the vehicle is an HEV mode even if a driver depresses a brake pedal. The purpose of the engine clutch anti-disengagement control is for securing quick driving response by removing the sequence of operating the engine and engaging the clutch in reacceleration.

However, when an engine RPM rapidly decreases or rapid braking is required while a vehicle is driven on a rough road and a mud mode or a sand mode is maintained in the terrain mode, the engine clutch anti-disengagement control may be performed for stable driving. Here, an engine RPM is considered as "rapidly decrease" when negative gradient of change of the engine RPM is lower than a predetermined value.

Accordingly, when a variation of the number of revolutions per hour of an engine exceeds the reference value A and the shaft torque of an engine clutch exceeds the predetermined reference value F with a mud mode or a sand mode remains selected in the terrain mode, control for stopping the engine clutch anti-disengagement control may be performed by the hybrid controller as a first method for disengaging early the engine clutch (S205).

For example, when the number of revolutions of an engine becomes a predetermined level or less by substituting the number of revolutions of an engine into a 2D map for each braking hydraulic pressure/vehicle speed, control for stopping the engine clutch anti-disengagement control may be performed.

In the instant case, when the control for stopping the engine clutch anti-disengagement control is performed by the hybrid controller, the hydraulic pressure supplied to the engine clutch is immediately stopped, so that the engine clutch may be disengaged.

Accordingly, when an engine RPM rapidly decreases or rapid braking is required while a vehicle is driven on a rough road and a mud mode or a sand mode is maintained in the terrain mode, it is possible to disengage early the engine clutch by performing the control for stopping the engine clutch anti-disengagement control, and accordingly, it is possible to secure stable driving when driving on a rough road.

Meanwhile, control for disengaging an engine clutch in a common on-road driving mode is performed through a step of decreasing engine torque when driver request torque which is the intention of acceleration of a driver decreases less than a predetermined level and the state of charge (SOC) value of a battery is a predetermined level or higher, and a step of stopping the hydraulic pressure supplied to the engine clutch for engagement when the shaft torque of the engine clutch is less than a reference level.

However, even if the shaft torque of the engine clutch exceeds the predetermined reference value F, when a mud mode or a sand mode remains selected in the terrain mode and the number of revolutions of the engine rapidly decreases due to a variation of the number of revolutions per hour of the engine exceeding the reference value A, it is required to forcibly disengage early the engine clutch for stable driving.

Accordingly, even if a variation of the number of revolutions per hour of an engine exceeds the reference value A and the shaft torque of an engine clutch exceeds the predetermined reference value F with a mud mode or a sand mode remains selected in the terrain mode, control for forcibly disengaging the engine clutch may be performed by the hybrid controller as a second method for disengaging early the engine clutch (S206).

Accordingly, when a vehicle is driven on a rough road with a mud mode or a sand mode selected in the terrain mode and an engine RPM rapidly decreases or rapid braking is required, the hydraulic pressure supplied to the engine clutch is immediately forcibly stopped regardless of the torque level applied to the engine clutch by the second method for disengaging early the engine clutch, whereby it is possible to disengage early the engine clutch and accordingly it is possible to secure stable driving when driving on a rough road.

Furthermore, by disengaging early the engine clutch when driving on a rough road with a mud mode or a sand mode selected in the terrain mode, it is possible to solve the problem in the related art that the number of revolutions of an engine decreases close to zero before an engine clutch is disengaged due to a rapid decrease of the number of revolutions of the engine in an HEV mode due to a very large driving load in the terrain mode and the present situation is misrecognized as an engine stall state.

Meanwhile, in consideration of the fact that a driver does not have a different driving feeling when driving the electrified vehicle on an off-road such as a muddy road or a sandy road in comparison to common road surfaces due to the characteristic of the road surface, it is possible to rapidly disengage an engine clutch by performing control for increasing the inclination of engine torque and the inclination of hydraulic pressure for disengaging the engine clutch (S207) when disengaging the engine clutch through the steps S205 and S206.

It may be possible to rapidly disengage the engine clutch by performing control for increasing the inclination of engine torque and the inclination of hydraulic pressure for disengaging the engine clutch when disengaging the engine clutch through the steps S205 and S206 on the basis of an increasing level of a variation of the number of revolutions per hour of the engine.

Furthermore, since a driver does not specifically have a different driving feeling when driving the electrified vehicle on an off-road such as a muddy road or a sandy road, the driver cannot feel a different feeling due to quick disengagement of the engine clutch, so that the engine clutch may be rapidly disengaged without a different feeling through the steps S205 and S206.

Furthermore, the term "controller" refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The controller according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors.

The controller may be at least one microprocessor operated by a predetermined program which may include a series of commands for carrying out a method in accordance with various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method of controlling an engine clutch of a vehicle, the method comprising:
    checking, by a controller, whether a driving mode of the vehicle has been selected as a terrain mode;
    checking, by the controller, whether a variation of a number of revolutions per hour of an engine is greater than a first reference value and whether a usage rate of electrical energy per hour of a motor is greater than a second reference value, upon determining that the terrain mode has been selected;
    adjusting, by the controller, an engagement condition of the engine clutch for launch acceleration, upon determining that the variation of the number of revolutions per hour of the engine is greater than the first reference value and the usage rate of electrical energy per hour of the motor is greater than the second reference value; and
    engaging, by the controller, the engine clutch through a launch engagement control method when the engagement condition of the engine clutch for launch acceleration is adjusted.

2. The method of claim 1, wherein the adjusting of an engagement condition of the engine clutch for launch acceleration includes:
    a control process of increasing a third reference value of an engine RPM, which is configured to be synchronized with a motor speed, to a predetermined level;
    a control process of adjusting a fourth reference value for a driving load and an acceleration variation of the vehicle to a predetermined level; and
    a battery state of charge (SOC) reference value correction control process of decreasing a fifth reference value for a battery SOC to a predetermined level.

3. The method of claim 2, wherein the control process of increasing the third reference value of an engine RPM, which is configured to be synchronized with a motor speed, to a predetermined level is performed to satisfy a condition for applying the launch engagement control method of engaging the engine clutch.

4. The method of claim 2, wherein the control process of adjusting the fourth reference value for a driving load and an acceleration variation of the vehicle to a predetermined level is performed to satisfy a condition for applying the launch engagement control method of engaging the engine clutch.

5. The method of claim 2, wherein the battery SOC reference value correction control process of decreasing the fifth reference value for a battery SOC to a predetermined level is performed to engage the engine clutch through the launch engagement control method.

6. The method of claim 2, wherein when the third reference value of an engine RPM, which is configured to be synchronized with a motor speed, is configured to be increased to a predetermined level, the fourth reference value for a driving load and an acceleration variation of the vehicle is adjusted to a predetermined level, and the fifth reference value for a battery SOC is decreased to a predetermined level, the engine clutch is engaged by the launch engagement control method.

7. The method of claim 1, wherein the launch engagement control method includes:
    a step in which the engine clutch is engaged through slip control of the engine clutch and engine torque is transmitted to the motor; and
    a step in which motor power is assisted by electrical energy stored and transmitted to the motor after a battery is charged by a charging operation of a hybrid starter generator according to an operation of the engine, or electrical energy produced by a charging operation of the hybrid starter generator is directly transmitted to the motor through an inverter and motor power is assisted.

8. The method of claim 1, further including:
    checking, by the controller, whether the driving mode of the vehicle is maintained as the terrain mode;
    checking, by the controller, whether a variation of the number of revolutions per hour of the engine has exceeded the first reference value with the engine clutch engaged and whether shaft torque of the engine clutch is greater than a fifth reference value, upon determining that the terrain mode is maintained; and performing, by the controller, control for stopping engine clutch anti-disengagement control or control for forcibly disengaging the engine clutch when the variation of the number of revolutions per hour of the engine is greater than the first reference value and the shaft torque of the engine clutch is greater than the fifth reference value.

9. The method of claim 8, wherein hydraulic pressure supplied to the engine clutch is stopped and the engine clutch is disengaged early by the control for stopping engine clutch anti-disengagement control or the control for forcibly disengaging the engine clutch.

10. The method of claim 8, wherein when the control for stopping engine clutch anti-disengagement control or the control for forcibly disengaging the engine clutch is performed, control for increasing an inclination of engine torque and an inclination of hydraulic pressure for disengaging the engine clutch is performed by the controller to disengage the engine clutch.

11. A vehicle comprising:
an engine and a motor;
an engine clutch mounted between the engine and the motor and selectively transmitting engine power therebetween; and
a controller including a processor and a non-transitory storage medium containing program instructions that, when executed by the processor, perform:
checking whether a driving mode of the vehicle has been selected as a terrain mode;
checking whether a variation of a number of revolutions per hour of the engine is greater than a first reference value and whether a usage rate of electrical energy per hour of the motor is greater than a second reference value, upon determining that the terrain mode has been selected;
adjusting an engagement condition of the engine clutch for launch acceleration, upon determining that the variation of the number of revolutions per hour of the engine is greater than the first reference value and the usage rate of electrical energy per hour of the motor is greater than the second reference value; and
engaging the engine clutch through a launch engagement control when the engagement condition of the engine clutch for launch acceleration is adjusted.

12. The vehicle of claim 11, wherein the adjusting of an engagement condition of the engine clutch for launch acceleration includes:
a control process of increasing a third reference value of an engine RPM, which is configured to be synchronized with a motor speed, to a predetermined level;
a control process of adjusting a fourth reference value for a driving load and an acceleration variation of the vehicle to a predetermined level; and
a battery state of charge (SOC) reference value correction control process of decreasing a fifth reference value for a battery SOC to a predetermined level.

13. The vehicle of claim 12, wherein the control process of increasing the third reference value of an engine RPM, which is configured to be synchronized with a motor speed, to a predetermined level is performed to satisfy a condition for applying the launch engagement control method of engaging the engine clutch.

14. The vehicle of claim 12, wherein the control process of adjusting the fourth reference value for a driving load and an acceleration variation of the vehicle to a predetermined level is performed to satisfy a condition for applying the launch engagement control method of engaging the engine clutch.

15. The vehicle of claim 12, wherein the battery SOC reference value correction control process of decreasing the fifth reference value for a battery SOC to a predetermined level is performed to engage the engine clutch through the launch engagement control method.

16. The vehicle of claim 12, wherein when the third reference value of an engine RPM, which is configured to be synchronized with a motor speed, is configured to be increased to a predetermined level, the fourth reference value for a driving load and an acceleration variation of the vehicle is adjusted to a predetermined level, and the fifth reference value for a battery SOC is decreased to a predetermined level, the engine clutch is engaged by the launch engagement control.

17. The vehicle of claim 11, wherein in the launch engagement control
the engine clutch is engaged through slip control of the engine clutch and engine torque is transmitted to the motor; and
motor power is assisted by electrical energy stored and transmitted to the motor after a battery is charged by a charging operation of a hybrid starter generator according to an operation of the engine, or electrical energy produced by a charging operation of the hybrid starter generator is directly transmitted to the motor through an inverter and motor power is assisted.

18. The vehicle of claim 11, wherein the program instructions that, when executed by the processor of the controller, further perform:
checking whether the driving mode of the vehicle is maintained as the terrain mode;
checking whether a variation of the number of revolutions per hour of the engine has exceeded the first reference value with the engine clutch engaged and whether shaft torque of the engine clutch is greater than a fifth reference value, upon determining that the terrain mode is maintained; and
performing control for stopping engine clutch anti-disengagement control or control for forcibly disengaging the engine clutch when the variation of the number of revolutions per hour of the engine is greater than the first reference value and the shaft torque of the engine clutch is greater than the fifth reference value.

19. The vehicle of claim 11, wherein hydraulic pressure supplied to the engine clutch is stopped and the engine clutch is disengaged early by the control for stopping engine clutch anti-disengagement control or the control for forcibly disengaging the engine clutch.

20. The vehicle of claim 11, wherein when the control for stopping engine clutch anti-disengagement control or the control for forcibly disengaging the engine clutch is performed, control for increasing an inclination of engine torque and an inclination of hydraulic pressure for disengaging the engine clutch is performed by the controller to disengage the engine clutch.

* * * * *